Dec. 26, 1961 L. JOSEPH 3,014,259
TWO-PIECE CLAMP
Filed Oct. 21, 1958
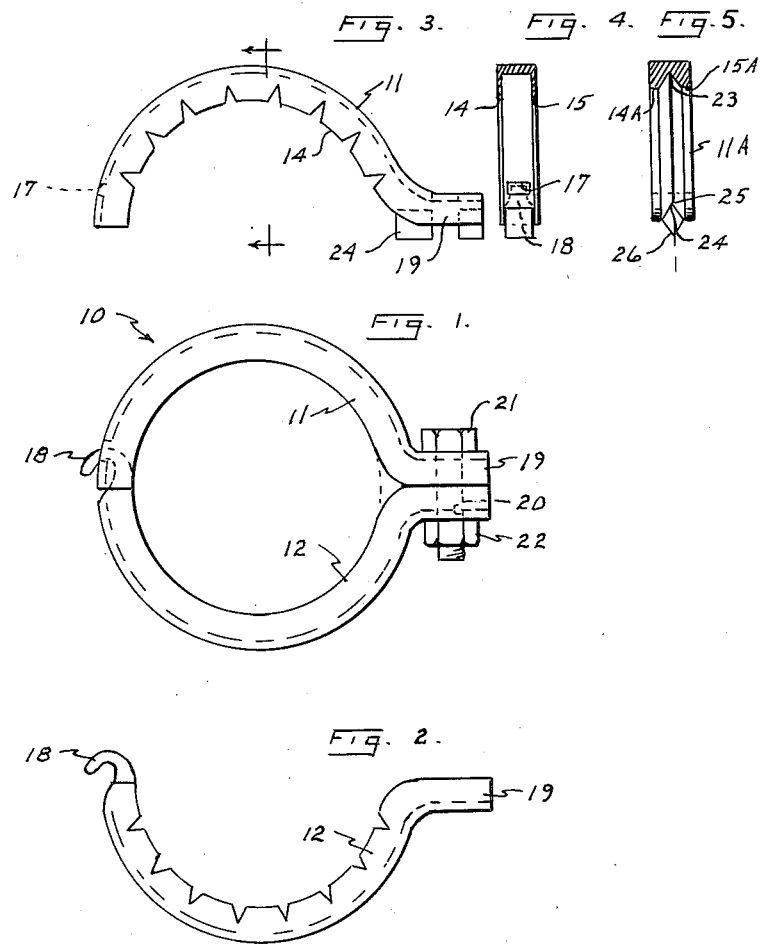
INVENTOR.
LOUIS JOSEPH
BY Howard T. Jeandron
ATTORNEY United States Patent Office 3,014,259
Patented Dec. 26, 1961

3,014,259
TWO-PIECE CLAMP
Louis Joseph, Brooklyn, N.Y. (% Sturdy Products Corp., 130 New York Ave., Jersey City 7, N.J.)
Filed Oct. 21, 1958, Ser. No. 768,742
1 Claim. (Cl. 24—284)

This invention relates to a two-piece clamp, and more particularly to the formation of a clamp that is formed with two semi-circular bands that are interconnected to form an exact internal diameter.

Clamping bands of the general type shown in this application are not new in the art, there are a great many that are comprised of a similar configuration; that is a circular form that may be made up of a single band or a two-piece band, and with the one-piece bands it is simply a matter of a means to fasten the loose ends together to provide the clamping action, and with the two-piece bands, it is a matter of clamping both ends of the semi-circular pieces together to form the circular band.

It is an object of this invention to provide a clamping band in which there are two semi-circular pieces and in which one end of each piece is provided with an interlocking means and in which the opposed ends are provided with apertures to permit drawing said ends together with a bolt or similar device to form a clamp having a predetermined internal diameter.

A further object of this invention is to provide a clamping band in which there are two semi-circular pieces and in which one end of each piece is provided with an interlocking means and in which the opposed ends are provided with apertures to permit drawing said ends together with a bolt or similar device, and in which the internal periphery of said clamping band is provided with a plurality of cut out portions in the bearing surface to permit a degree of yield in the clamping operation.

Further objects of this invention shall be apparent by reference to the accompanying detailed description and the drawings, in which:

FIG. 1 is a plan view of the clamp;
FIG. 2 is a plan view of the lower half of the clamp;
FIG. 3 is a plan view of the upper half of the clamp;
FIG. 4 is a cross-sectional view, taken on line 4—4 of FIG. 3; and
FIG. 5 is a cross-sectional view of a further embodiment.

Referring to the drawings, there is illustrated a clamp 10 that is formed circular to provide a clamping action over approximately 360°. This type of clamp is primarily provided for automobile mufflers, to clamp the pipe at either end of the muffler in a tight fitting relation with the muffler. Various types of clamps have been used for this particular installation and there have been so many weaknesses or undesirable features that this clamp is designed to overcome the past mistakes.

Referring to FIG. 4, a cross section of the web of the half 11 of the clamp is illustrated; both halves are formed in this U-shape, and the cross-section or gauge is fairly heavy. It is to be noted that it is the open end of the inverted U-shaped web that actually bears against the pipe or element to be encompassed by this clamp. Thus, the edges 14 and 15 will be the bearing surfaces. Clamp 10 is composed of two halves, 11 and 12, which are generally identical, but one end of the clamp is formed to provide an interlocking relation. Thus the half 11, as shown in FIG. 4, is provided with an aperture 17 at one end thereof, while the half 12 is provided with a hook shaped end 18, the hook element 18 is, of course, made of a width to fit the aperture 17, so that the two halves 11 and 12 may be joined as shown in FIG. 1. The opposite ends of each half are formed as a straight flange 19, and are identical.

Each flange 19 is provided with an aperture 20 to permit a bolt 21 to be passed therethrough and a nut 22 threadably secured to the bolt 21 to draw the flanges 19 into their parallel abutting relation in the maximum closed position.

It is apparent that when the clamp is in the closed position as illustrated in FIG. 1, that the edges 14 and 15 of each half 11 and 12 will provide a bearing or squeezing surface. When the clamp is applied, if the clamp is provided with a straight wall, as shown in FIG. 1, there will be a contact with the circular surface of slightly less than 360°, and as the pressure increases with the tightening of the nut 22, pulling flanges 19 together, there must be a slight movement of the two halves 11 and 12 toward each other and an adjustment of the contact with the surface of the tube inserted therein. It has been found that if the walls of the U-shaped web are cut out with small V-shaped cuts, as shown in FIGS. 2 and 3, there is a better adjustment of the clamp to the periphery of the tube, and, in addition, as the maximum pressure is induced, the cut out portions permit a slight yield or drawing in of the clamp without moving the surfaces that are then in contact; this slight yield permits a much greater pressure being induced in the final stages of clamping.

Referring to FIG. 5, there is illustrated a further embodiment of this invention, in which the cross-sectional area of the halves 11 and 12 are formed with the same flat outside periphery, while the inside periphery of the clamp is formed as a V-shaped groove 23 providing contacting edges 14A and 15A similar to the edges shown in FIG. 4. The half 11A shown in FIG. 5 is of the same configuration as shown in FIG. 3, and is similarly provided with an aperture 17 and a flange 19. It is to be noted that the edges 14A and 15A are not brought to a sharp edge, but rather are provided as small flat areas so that when the clamp is in the closed position as shown in FIG. 1, these flat areas 14A and 15A on the flanges 19 will lie in abutting relationship. It is also to be noted that the cross sectional view taken on FIG. 3 to illustrate FIG. 5 is in an opposite direction to that shown in FIG. 4, as there is an additional feature to be shown. The V-shaped groove 23 extends to the end of the flange 19. In order that both halves 11 and 12 will fit into a perfect alignment, a rectangular block 24 may be utilized, that is one edge 25 of the block is fitted into the V-shaped groove 23 of half 11, while the opposite edge 26 is fitted into the groove 23 of half 12. Since the bolt 21 must pass through flange 19, the block 24 may be fitted on either side of the bolt, or two blocks 24 may be utilized one on each side of bolt 21. In the embodiment shown in FIG. 4, a rectangular block may also be used for the same purpose, but due to the shape of the flanges 19, the block would be inserted between the walls of the U-shaped end and should be short enough to allow for the complete closing of the clamp. The blocks 24 may be used as an insert or they may be spot welded to hold them in place. To provide a perfect alignment of the opposite ends of clamp 10, the hook-shaped end 18 may be fitted into an abutting relationship with the internal wall surfaces, as shown in dotted lines in FIG. 4.

The clamp 10, being formed from a heavy gauge material, is intended to provide a very exact fit, that is, in the tightly closed position illustrated in FIG. 1, the clamp is intended to provide an exact inside diameter and it cannot be closed or provided to give a clamping action less than this diameter. The reason for providing this limitation is to prevent the actual crushing of the clamped pipe, such as the tail pipe of an automobile; a tight fit of the tail pipe with the muffler may be attained with this clamp without crushing the pipe. Because of this feature, the clamp 10 is made in a variety of sizes. It is the inside diameter of the clamp that must fit the exact required outside diameter of the pipe with which it is to be used. It is to be noted in the manufacture of these clamps that the completed clamp 10 shown in FIG. 1 is actually fitted to a perfect mandril to insure the exact inside diameter of each and every clamp.

It is apparent that the clamp 10 disclosed in this application may be formed with a U-shaped cross-section; however, this should not be construed as a limitation, as the cross-section may be a solid band or of a different cross-section, as long as there are two protruding edges 14 and 15 to provide the actual bearing contact. It is also apparent in this clamp that although the two halves 11 and 12 have been joined at one end by means of a hook shaped element 18 and a slot 17, any similar type of connecting element or elements may be used without departing from the spirit of this invention, and it is apparent that although the opposite side of the clamp has been constructed with a pair of flanges 19 and a bolt 21 to pull the flanges together, it is understood that any similar type of fastening element may be utilized without departing from the spirit of this invention, and it is understood that although the side webs of the U-shaped element have been provided with V-shaped cut out portions, the web may be simply provided with slits of any form to permit a slight degree of yield, without departing from the spirit of this invention, and although one means of retaining both halves in alignment has been shown, other means may be employed without departing from the spirit of this invention, and this invention shall be limited only by the appended claim.

What is claimed is:

A two-piece circular clamp in which each half is formed generally semi-circular, and in a generally U cross-section, the base of the U cross-section forming the outside circumference of the clamp, one half being provided with a flange at one end and having a perforation through the base of the U cross-section on the opposite end, the other half of the clamp being provided with a similar flange on one end and a hook shaped element on the opposite end, said hook shaped element being formed to fit into the perforation through the end of the opposite half to engage the two halves in an abutting relationship, one half being provided with an aligning block within the U-shaped flange, said aligning block protruding from one flange to mate with and fit into the U-shaped flange of the opposite half, said flanges of each half abutting with each other in the fully closed position to provide a predetermined internal diameter, and means being provided to fasten said flanges in this abutting relationship.

References Cited in the file of this patent

UNITED STATES PATENTS

| | | |
|---|---|---|
| 1,471,386 | Crockett | Oct. 23, 1923 |
| 1,928,316 | Muto | Sept. 26, 1933 |
| 2,417,741 | Dillon | Mar. 18, 1947 |
| 2,548,216 | Houghton et al. | Apr. 10, 1951 |
| 2,628,851 | Jessup | Feb. 17, 1953 |

FOREIGN PATENTS

| | | |
|---|---|---|
| 343,055 | France | of 1904 |
| 7,931 | Great Britain | of 1913 |
| 822,019 | France | Sept. 6, 1937 |
| 43,787 | Netherlands | Aug. 15, 1938 |
| 610,441 | Great Britain | Oct. 15, 1948 |
| 736,879 | Great Britain | Sept. 14, 1955 |
| 158,999 | Sweden | May 28, 1957 |